No. 860,263. PATENTED JULY 16, 1907.
W. F. STEARNS.
APPARATUS FOR MOLDING CRESCENT FILLERS FOR TIRES.
APPLICATION FILED AUG. 8, 1904.

4 SHEETS—SHEET 1.

Witnesses:
Sydney S. Taft.
E. A. Allen.

Inventor:
William Francis Stearns
by his attorney
Edward S. Beach

No. 860,263. PATENTED JULY 16, 1907.
W. F. STEARNS.
APPARATUS FOR MOLDING CRESCENT FILLERS FOR TIRES.
APPLICATION FILED AUG. 8, 1904.

4 SHEETS—SHEET 3.

UNITED STATES PATENT OFFICE.

WILLIAM FRANCIS STEARNS, OF BATAVIA, NEW YORK.

APPARATUS FOR MOLDING CRESCENT FILLERS FOR TIRES.

No. 860,263.

Specification of Letters Patent.

Patented July 16, 1907.

Application filed August 8, 1904. Serial No. 219,810.

*To all whom it may concern:*

Be it known that I, WILLIAM FRANCIS STEARNS, a citizen of the United States, residing at Batavia, in the county of Genesee and State of New York, have invented certain new and useful Improvements in Apparatus for Molding Crescent Fillers for Tires, of which the following is a specification, reference being had therein to the accompanying drawing.

Figure 1:
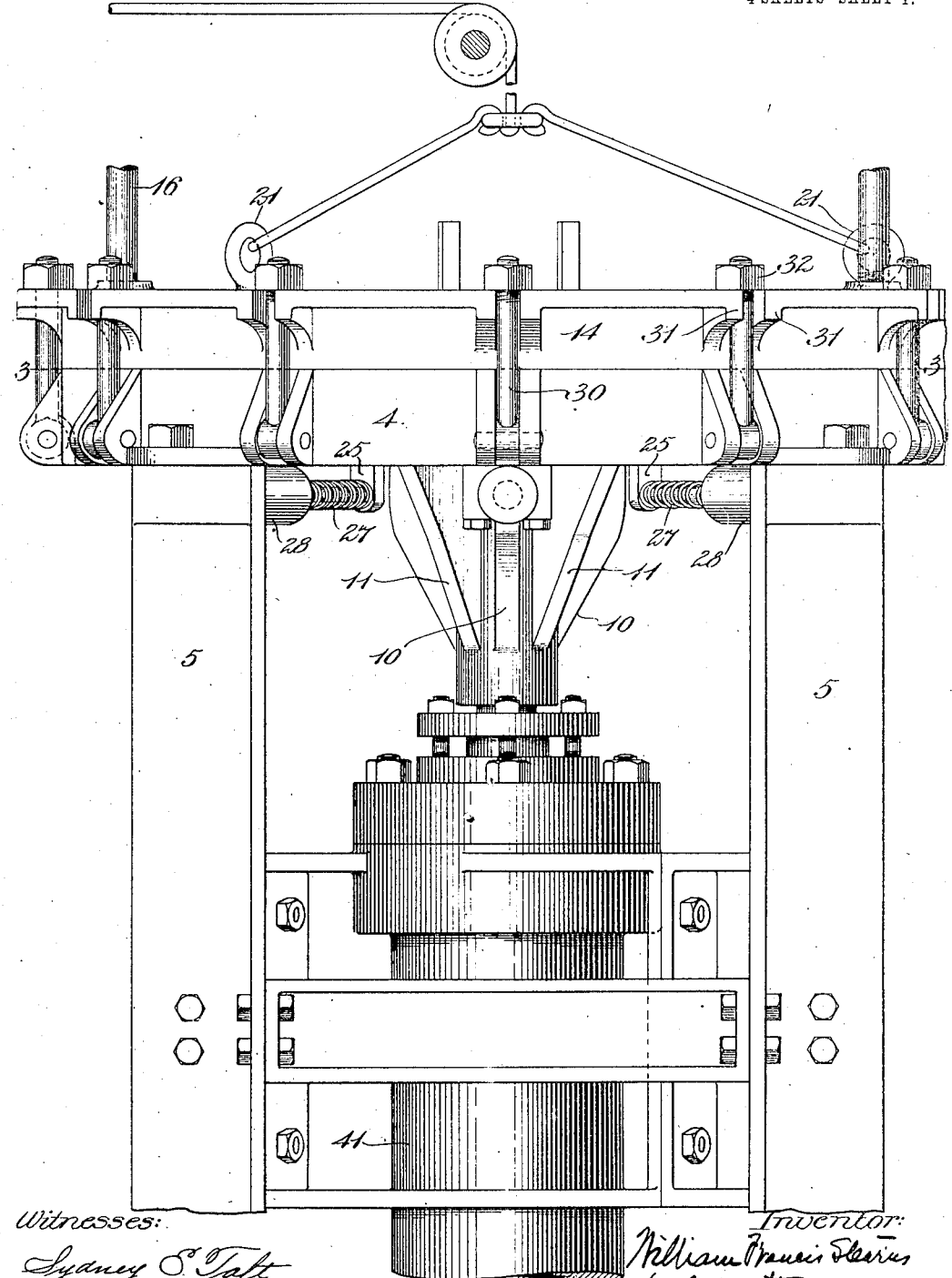
Figure 2:
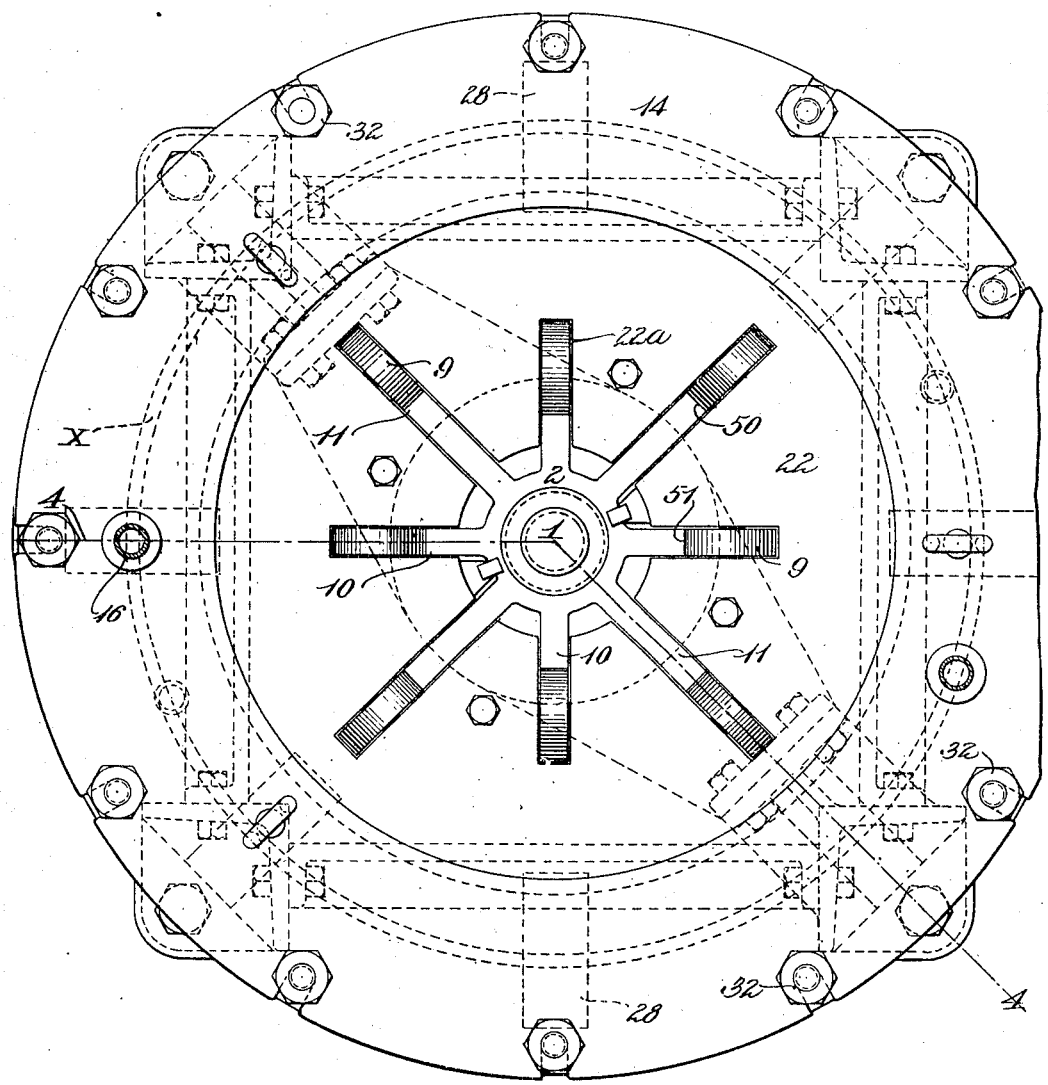
Figure 3:
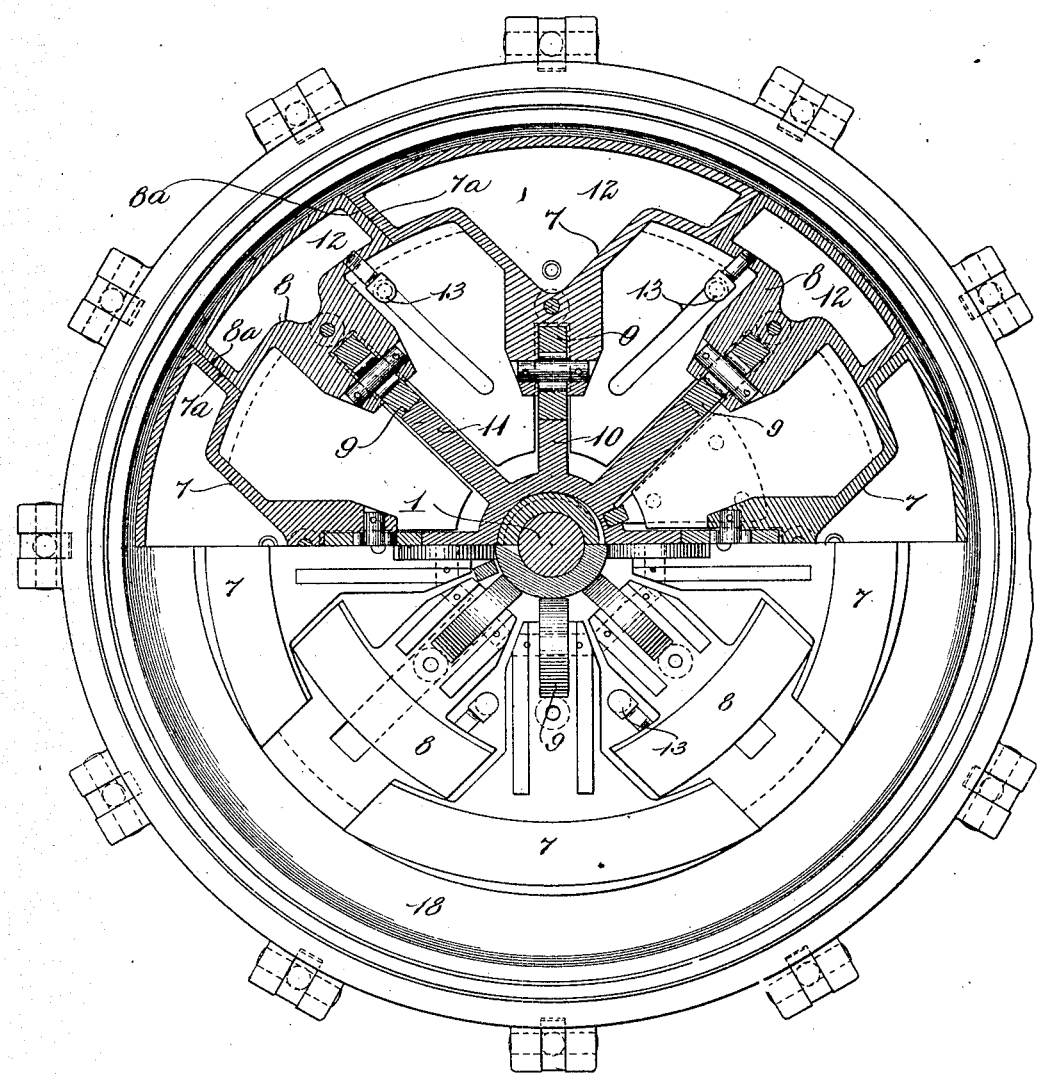
Figure 4:
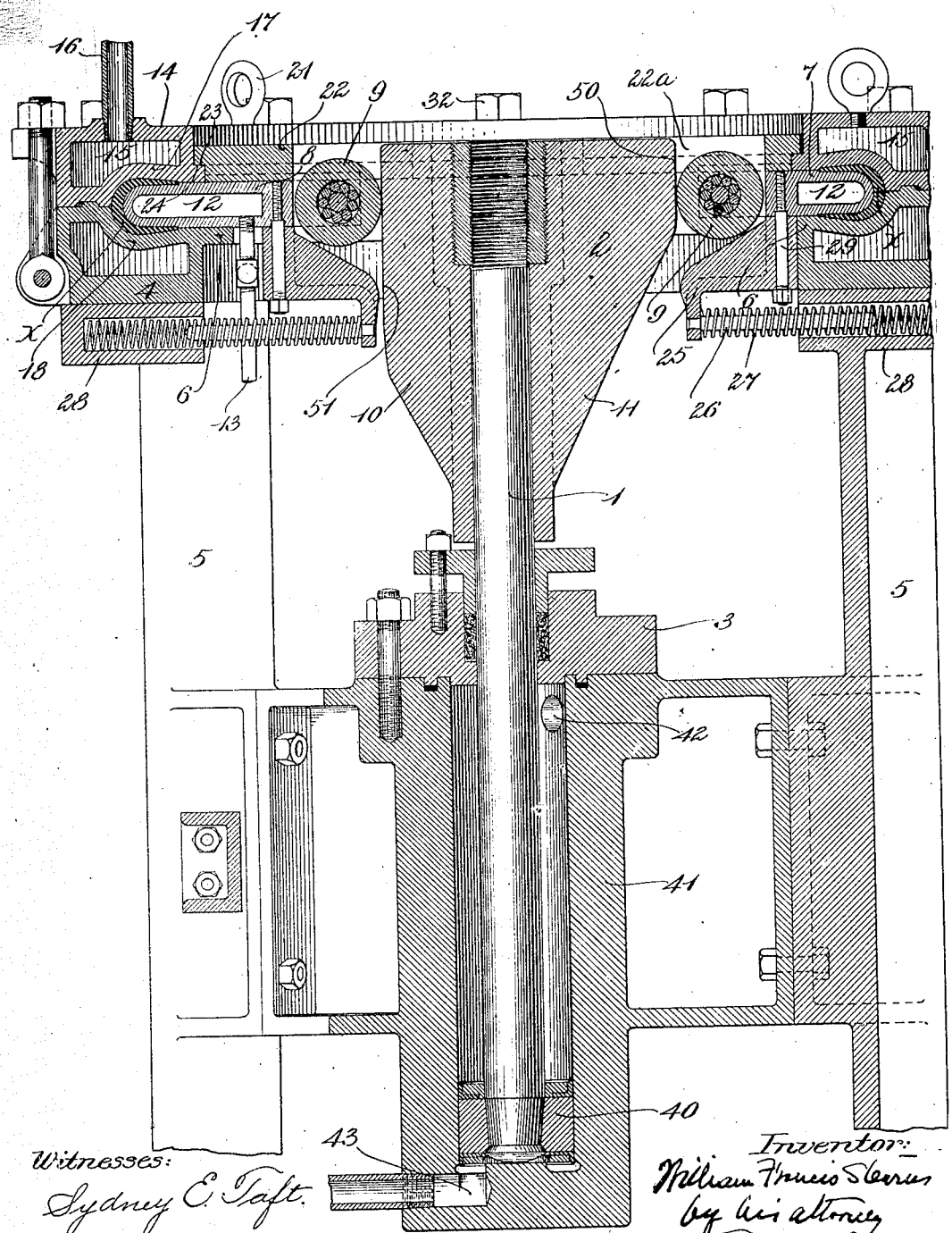

Figure 1 is a side elevation of the machine, the hydraulic cylinder being broken off near its lower end. Fig. 2 is a top plan view of the machine. Fig. 3 is a view, partly in top plan elevation, the cover being removed; and partly in horizontal section on line 3—3 of Fig. 1. Fig. 4 is a vertical section on line 4—4 of Fig. 2.

The object of my invention is to produce a machine for effectively molding and properly giving fixed, crescent-like shape to fillers for tires, especially fillers of the general construction shown in U. S. patents, Nos. 523,314 of July 17, 1894; 504,144 of Aug. 29, 1893; 506,594 of Oct. 10, 1893; 514,796 of Feb. 13, 1894; 521,005 of June 5, 1894; 521,006 of June 5, 1894; 526,846 of Oct. 2, 1894; 589,770 of Sept. 7, 1897; 634,920 of Oct. 17, 1899; 634,951 of Dec. 26, 1899; 654,278 of July 24, 1900; 674,436 of May 21, 1901; 668,733 of Feb. 26, 1901, and 693,818 of Feb. 18, 1902, the latter to Haines and myself as assignors and wherein there is shown a crescent-shaped filler for the molding and vulcanizing of which in fixed form the present machine is well adapted. All such fillers have been heretofore shaped partly by hand and partly by air-pressure after being assembled in the tire-sheath with an inflatable pneumatic tire, the vulcanizing having been done at another time, and the whole requiring several operations all of which are eliminated by my present method of molding, vulcanizing and shaping these fillers in fixed form. According to my method, the cotton or other fibers which constitute the stuffing of the pad are compacted under heavy pressure at the same time the fillers are shaped and vulcanized. Heretofore, as I am informed, the fillers of the general type disclosed by said patents have been made only to a very limited extent and sporadically or experimentally; no mechanically and commercially practicable way of producing them for the market, in proper condition and with requisite economy, having been known.

In the drawings illustrating the principle of my invention and the best mode now known to me of applying the same, 1 is a reciprocating plunger carrying a fixed cam 2, and moving through a guide 3, which, in the present form, is a stuffing-box. The plunger moves centrally through the aperture of an annular mold 4, supported horizontally on upright frame 5. Mold 4 is a half mold, and on its inner, peripheral, horizontal surface 6 (Fig. 4) horizontally sliding, segmental plunger-molds 7 and 8 are supported. The outer surfaces of the plunger-molds 7 and 8 form a continuous annular pressing surface for the inner side of the filler $x$, when all of the plunger-molds are moved into their outer position, as indicated in the sectional part of Fig. 3. Plunger-molds 7, at their outer ends, are longer than are the outer ends of the plunger-molds 8, these plunger-molds 7 and 8 alternating, the plunger-molds 7 being first moved into their outer pressing position, and then being followed by the shorter plunger-molds 8, the ends $8^a$ of molds 8 being inclined with reference to the opposed ends $7^a$ of the longer plunger-molds 7, so that molds 8 may slide in between molds 7 after the latter are brought to their outermost pressing position, and the outer peripheral surfaces of the molds 7 and 8 then form a continuous pressing surface.

Each mold 7 and 8 has a rearward forked lug, radial to the central vertical axis of plunger 1, and carries at its rear end, in the fork, an anti-friction roll 9, loose on a pin $10^a$, transversely mounted in the arms of the fork. The forked arms of the plunger-molds 7 are longer,—that is, extend nearer to plunger 1,—than are the forked arms of the plunger-molds 8; and cam 2 has alternating vertical cam-ribs 10 and 11, the cam-ribs 11 extending farther from plunger 1 than do the cam-ribs 10, which latter engage the rolls 9 f the plunger-molds 7, the cam-ribs 11 engaging the rolls 9 of the molds 8, the alternating cam-ribs 10 and 11 co-operating with the cam-rolls 9 of the alternating plunger-molds 7 and 8 to force all the plunger-molds 7 into their outer position, and then to slide the plunger-molds 8 in between the plunger-molds 7 and into final pressing position. Each mold 7 and 8 has a chamber 12 supplied with heat for vulcanizing through a supply pipe 13. A removable annular half mold 14, provided with a central aperture and with an interior chamber 15 for vulcanizing heat, and heat-pipe 16 is provided and formed with an annular molding surface 17, which is complementary to the molding surface 18 of the half mold 4, and in the crescent-like space formed by the walls 17 and 18 of the half molds 4 and 14 the filler $x$ is placed for compression into fixed form, and for vulcanization. Upper mold 14 is conveniently provided with eyes 21 for the reception of a lifting contrivance whereby the upper mold 14 is lifted off the under half mold 4 when the filler is placed in and removed from mold position.

A ring-shaped plate 22 having radiating slots $22^a$ from its inner periphery and having peripheral under shoulder 23 at its outer edge is mounted in the annular space of the upper mold 14, the upper mold 14 having an inner peripheral shoulder 24 on which said shoulder 23 rests, so that the ring 22 is carried by mold 14 when the mold 14 is raised or lowered. The under surface of ring 22 rests on the upper surfaces of the plunger-molds 7 and 8, and with the under, inner peripheral margin of the upper mold 14 forms a horizontal guide surface for the upper surfaces of the plunger-molds 7 and 8, which, consequently, reciprocate on and between such upper surfaces and the marginal surfaces 6 of the lower mold, 4, anti-friction rolls 9 projecting upwardly in slots $22^a$. Each plunger-mold 7 and 8 has a rearwardly and downwardly extending arm 25 (Fig. 4) projecting into the annular opening of under mold 4. Each arm 25 carries a horizontal, outwardly extending guide-pin 26, surrounded by a coiled spring 27, the inner end of the spring abutting against the inner wall of the arm 25 and the outer end-wall of spring-receiving chamber 28, with which frame 5 is provided. Springs 27 automatically push plunger-molds 7 and 8 inwardly when cam 2 ceases to restrain their inward movement. Arms 25 are conveniently made in separate pieces from molds 7 and 8, and clamped thereto by bolts 29. Molds 4 and 14 are clamped together during the time of the molding and vulcanizing operations conveniently by means of hinged bolts 30 on under mold 4, which fits into bolts between outward lugs 31 on upper die 14, clamp-nuts 32 being provided for bolts 30 to hold the bolts in place and molds 4 and 14 tightly together.

Plunger-molds 7 and 8 may, of course, be reciprocated in various mechanical ways, and my invention is not limited to any particular apparatus for either moving the plunger-molds forwardly or retracting them. In the present construction, the plunger-molds 7 and 8 are moved forwardly by cam 2 through the instrumentality of the plunger 1, which is a piston-carrier, being provided with piston 40 which moves in a piston-chamber 41, provided on one side of the piston with a port 42, and on the other side with a port 43. As shown in Fig. 1, plunger-molds 7 and 8 are in their outermost pressing position and cam 2 in pressing position against the anti-friction rolls 9. After the filler has been molded and vulcanized, the upper mold 14 is lifted to a proper height,—carrying with it ring 22,—and then pressure is admitted through the port 43 against piston 40, which then carries plunger 1 and cam 2 upwardly through the annular space of lower mold 40, the cam surfaces 11 being so shaped as to permit the short mold 8 to move inwardly before the longer molds 7 move inwardly. This is accomplished, in the present construction, by providing cam-ribs 11 with a short, vertical cam-surface 50 which passes its opposed roll 9 before the longer, vertical cam-surfaces 51 of the cam-ribs 10 pass out of engagement with the rolls 9 of the plunger-molds 7. (See Fig. 4.)

In Fig. 4, the filler $x$ is merely indicated as a homogeneous structure, and the apparatus may be used for molding homogeneous structures, if desired.

Apparatus or machines embodying my invention may be constructed in various other forms than that shown without departure from my invention.

What I claim is:

In combination, annular, coöperating molds; a plurality of plunger molds circularly arranged within the circumference of the annular molds so as to coöperate with the latter; a reciprocating plunger; and a cam-head carried by said plunger, said head being provided with a plurality of alternately-arranged radiating long and short cam-ribs; and means whereby said cam-ribs may coöperate with the plunger molds, respectively, whereby the said ribs drive the plunger molds into coöperation with the annular molds.

In testimony whereof I affix my signature in presence of two witnesses.

WILLIAM FRANCIS STEARNS.

Two witnesses:
EDWARD S. BEACH,
E. A. ALLEN.